United States Patent
Doyle et al.

(10) Patent No.: US 10,509,637 B2
(45) Date of Patent: *Dec. 17, 2019

(54) DISTRIBUTED PACKAGE MANAGEMENT USING META-SCHEDULING

(71) Applicant: Mesosphere, Inc., San Francisco, CA (US)

(72) Inventors: Connor Patric Doyle, San Francisco, CA (US); Thomas Rampelberg, San Francisco, CA (US); Cody Maloney, San Francisco, CA (US); José Armando García Sancio, San Francisco, CA (US)

(73) Assignee: Mesosphere, Inc., San Francisco, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 15/829,740

(22) Filed: Dec. 1, 2017

(65) Prior Publication Data

US 2018/0157474 A1 Jun. 7, 2018

Related U.S. Application Data

(63) Continuation of application No. 14/931,714, filed on Nov. 3, 2015, now Pat. No. 9,880,825.

(60) Provisional application No. 62/202,047, filed on Aug. 6, 2015.

(51) Int. Cl.
| | |
|---|---|
| *G06F 11/00* | (2006.01) |
| *G06F 8/61* | (2018.01) |
| *H04L 29/08* | (2006.01) |
| *G06F 11/14* | (2006.01) |
| *G06F 9/48* | (2006.01) |
| *G06F 9/445* | (2018.01) |

(52) U.S. Cl.
CPC ............. *G06F 8/61* (2013.01); *G06F 9/48* (2013.01); *G06F 11/1438* (2013.01); *H04L 67/34* (2013.01); *G06F 9/44505* (2013.01)

(58) Field of Classification Search
CPC ...................................................... G06F 8/61
USPC ................................. 714/23, 24, 25, 1, 47.1
See application file for complete search history.

(56) References Cited

U.S. PATENT DOCUMENTS

| | | |
|---|---|---|
| 7,984,268 B2 | 7/2011 | Hass |
| 8,347,337 B2 | 1/2013 | Barton |
| 8,819,266 B2 | 8/2014 | Salonikios |
| 9,304,803 B2 | 4/2016 | Nelson |
| 2014/0006620 A1 | 1/2014 | Assuncao |

*Primary Examiner* — Dieu Minh T Le
(74) *Attorney, Agent, or Firm* — Van Pelt, Yi & James LLP

(57) ABSTRACT

A system for package management includes an interface and a processor. The interface is to receive an indication to install a package. The processor is to determine a configured package using a set local configuration properties and using the package and to launch, using a metascheduler, a set of sub schedulers to install a plurality of applications of the configured package.

19 Claims, 13 Drawing Sheets

DISTRIBUTED PACKAGE MANAGEMENT USING META-SCHEDULING

CROSS REFERENCE TO OTHER APPLICATIONS

This application is a continuation of co-pending U.S. patent application Ser. No. 14/931,714, entitled DISTRIBUTED PACKAGE MANAGEMENT USING META-SCHEDULING, filed Nov. 3, 2015, which claims priority to U.S. Provisional Patent Application No. 62/202,047, entitled DISTRIBUTED PACKAGE MANAGEMENT USING META-SCHEDULING, filed Aug. 6, 2015, both of which are incorporated herein by reference for all purposes.

BACKGROUND OF THE INVENTION

Common software systems are increasingly distributed, composed of multiple software systems that execute simultaneously on many computers. These attributes complicate software lifecycle management, such as reliably distributing artifacts, launching, monitoring, and relaunching software processes. Traditional methods deal only with lifecycle management on a single computer.

BRIEF DESCRIPTION OF THE DRAWINGS

Various embodiments of the invention are disclosed in the following detailed description and the accompanying drawings.

DETAILED DESCRIPTION

Figure 1:
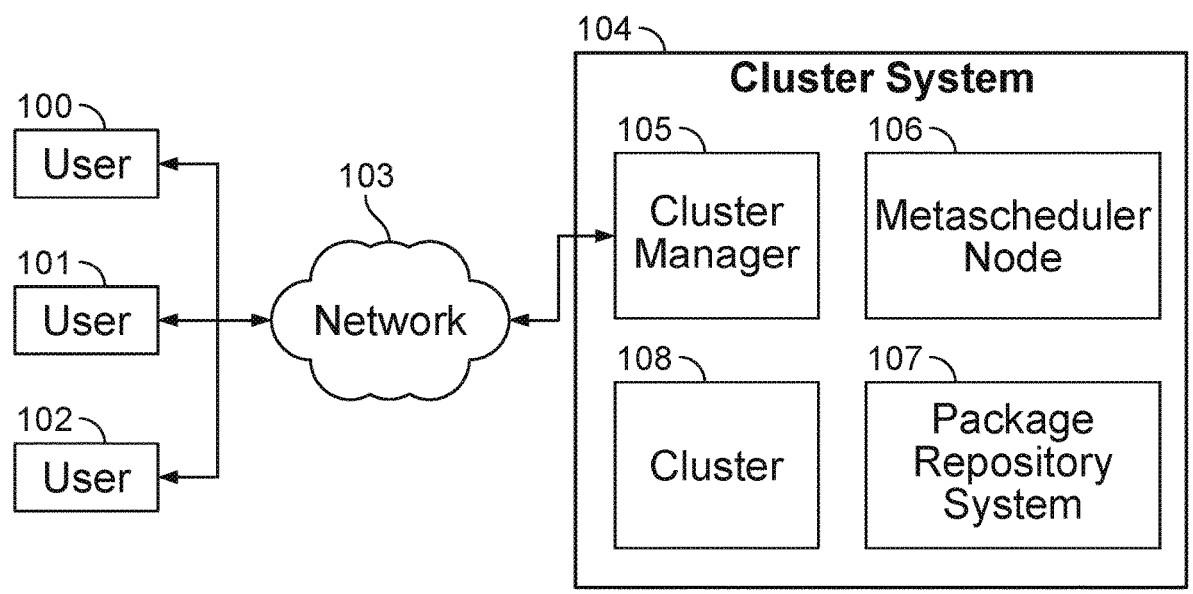
FIG. 1 is a block diagram illustrating an embodiment of a system for installation and monitoring of packages on a cluster using a metascheduler.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for package management is disclosed. The system comprises an interface and a processor. The interface is to receive an indication to install a package. The processor is to determine a configured package using a set local configuration properties and using the package and launch using a metascheduler a set of subschedulers to install a plurality of applications of the configured package. In some embodiments, the system comprises a memory coupled to the processor and configured to provide the processor with instructions.

In some embodiments, a system for distributed package management using meta-scheduling is disclosed. The system comprises an interface and a collection of computer systems organized in a cluster system. The cluster system comprises a cluster manager, a metascheduler node, a package repository system, and a cluster. The cluster of the cluster system comprises a plurality of computer systems referred to as cluster nodes. The cluster manager comprises a command-line interface and a processor. In some embodiments, the cluster manager comprises a processor that runs software implementing cluster manager functionality.

In some embodiments, the command-line interface receives a selection of software packages to be installed on one or more cluster nodes in a cluster. The processor iterates through the selection of software packages. In some embodiments, the processor applies a local configuration to each selected software package to create a configured software package. In some embodiments, the processor sends the configured software packages to the metascheduler for installation on one or more cluster nodes. The metascheduler indicates to a number of subschedulers on one or more cluster nodes determined by the configured software package that the configured software package is to be installed. In some embodiments, each subscheduler receives additional package data (e.g., installable software and application files) from a package repository system. Each subscheduler installs the configured software package and additional package data on a cluster nodes.

In some embodiments, the system employs multi-tiered fault detection and correction. In some embodiments, the metascheduler reports the success or failure of its tasks to the cluster manager. In the event of metascheduler failure, the cluster manager is able to perform a remedial action (e.g., restarting a computer system, relaunching a software application, and restarting the metascheduler). In some embodiments, each subscheduler reports the success or failure of its tasks to the metascheduler. In the event of task failure, the subscheduler is able to perform remedial action (e.g., restarting package installation) on its cluster node. In the event of subscheduler failure, the metascheduler is able to take remedial action (e.g., restarting the subscheduler, rebuilding the cluster node, or restarting package installation).

In some embodiments, each subscheduler monitors the performance and success of applications running as part of the configured software package. In some embodiments, the configuration of the configured software package indicates performance parameters. When the performance of applications running as part of the configured software package fall outside of the bounds of the indicated performance parameters, the subscheduler can take remedial action to bring the performance of applications within the indicated performance parameters. In some embodiments, the remedial action includes instructing the metascheduler to indicate the installation of the configured software package by additional subschedulers. In some embodiments, the remedial action includes instructing the metascheduler to indicate the uninstallation of the configured software package on existing cluster nodes by subschedulers.

In some embodiments, a package repository system comprises a package repository controller and a package repository. The package repository stores unconfigured software packages. In some embodiments, an unconfigured software package contains data records as JSON-formatted files (e.g., command.json, config.json, marathon.json, and package.json). In various embodiments, each data record in a software package comprises one or more of the following: specific actions, configurable parameters, or any other appropriate other information. In some embodiments, command.json includes tasks that the configured software package will execute on a cluster node. In some embodiments, package.json includes additional software to be installed by the system. The package repository controller receives a request from a system for an unconfigured software package. The package repository controller retrieves the unconfigured software package from the package repository and delivers it to the requesting system.

FIG. 1 is a block diagram illustrating an embodiment of a system for installation and monitoring of packages on a cluster using a metascheduler. In the example shown, cluster system 104 includes cluster manager 105, metascheduler node 106, package repository system 107, and cluster 108. Cluster system 104 is also coupled to network 103. Network 104 enables user 100, user 101, and user 102 to connect to cluster system 104. In some embodiments, user 100, user 101, and user 102 communicate with cluster manager 105 using network 103. Cluster manager 105 manages metascheduler node 106, package repository system 107, cluster 108, and other subsystems of cluster system 104. Metascheduler node 106 comprises a node of the cluster that schedules subschedulers. Metascheduler node 106 is able to launch subscheduler(s) and is able to delete subscheduler(s). Metascheduler node 106 is able to install applications of a package on one or more nodes of cluster 108. Metascheduler node 106 stores/retrieves the package to/from package repository system 107.

Figure 2:
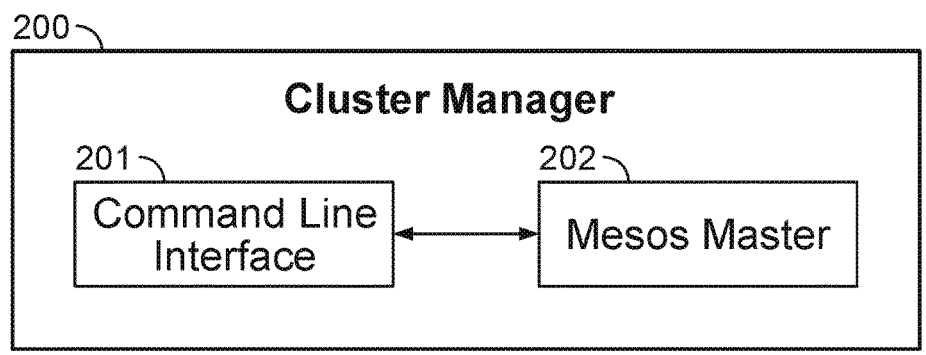
FIG. 2 is a block diagram illustrating an embodiment of a system comprising a cluster manager.

FIG. 2 is a block diagram illustrating an embodiment of a system comprising a cluster manager. In some embodiments, cluster manager 200 of FIG. 2 comprises cluster manager 105 of FIG. 1. In the example shown, cluster manager 200 includes command line interface 201 and mesos master 202. Command-line interface 201 receives an instruction from a user to install a package. Metadata is retrieved from a package repository system including configurable properties that the package supports. Configuration values are merged with the default values and are combined with template launch descriptors to generate a configured package that is provided to a metascheduler by mesos master 202. The metascheduler launches one or more subschedulers in the cluster. In the event that any of the one or more subschedulers fails, the metascheduler can take remedial action to start a new copy of the subscheduler and restart the process(es). The subscheduler registers with the cluster manager and installs applications and executes tasks to provide package services. The subscheduler automates and optimized operations including autoscaling replicas (e.g., installing applications and executing tasks on more cluster nodes or deleting them) to meet demand. Once the package tasks are instantiated the subscheduler can monitor the tasks. In the event that a task fails, the subscheduler can take remedial action (e.g., installing application and executing task on another cluster node).

Figure 3:
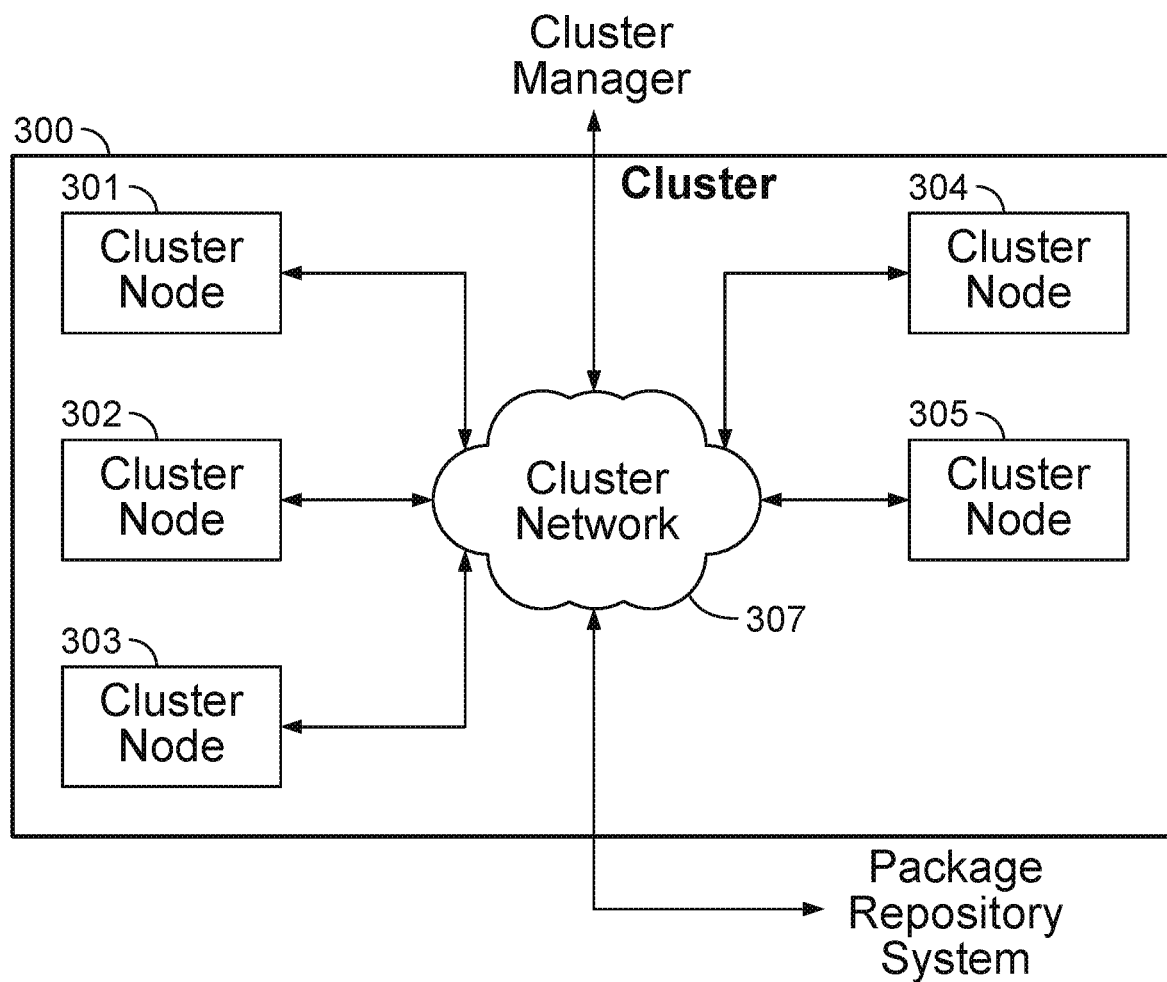
FIG. 3 is a block diagram illustrating an embodiment of a system for managing a cluster using a cluster manager.

FIG. 3 is a block diagram illustrating an embodiment of a system for managing a cluster using a cluster manager. In some embodiments, cluster 300 of FIG. 3 comprises cluster 108 of FIG. 1. In the example shown, cluster 300 comprises cluster network 307 and cluster nodes (e.g., cluster node 301, cluster node 302, cluster node 303, cluster node 304, cluster node 305, etc.). Cluster manager communicates with cluster nodes of cluster 300 using cluster network 307. Cluster nodes of cluster 300 and package repository system communicate with each other using cluster network 307. A cluster node is used for executing system processes. In various embodiments, a cluster node is used to execute a subscheduler, a metascheduler, a package task, or any other appropriate system process.

Figure 4:
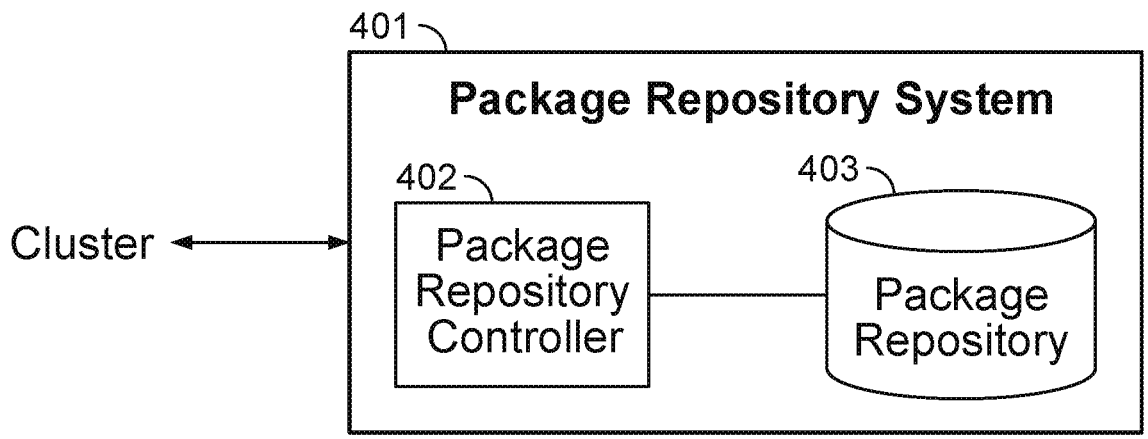
FIG. 4 is a block diagram illustrating an embodiment of a package repository system as part of a cluster system.

FIG. 4 is a block diagram illustrating an embodiment of a package repository system as part of a cluster system. In some embodiments, package repository system 401 of FIG. 4 comprises package repository system 107 of FIG. 1. In the example shown, package repository system 401 comprises package repository controller 402 and package repository 403. Package repository 403 stores unconfigured software packages. The software packages can be configured and then provided to be installed. In various embodiments, configured packages are used to install a set of applications, a subscheduler, a metascheduler, a task executor, or any other appropriate set of software.

Figure 5:
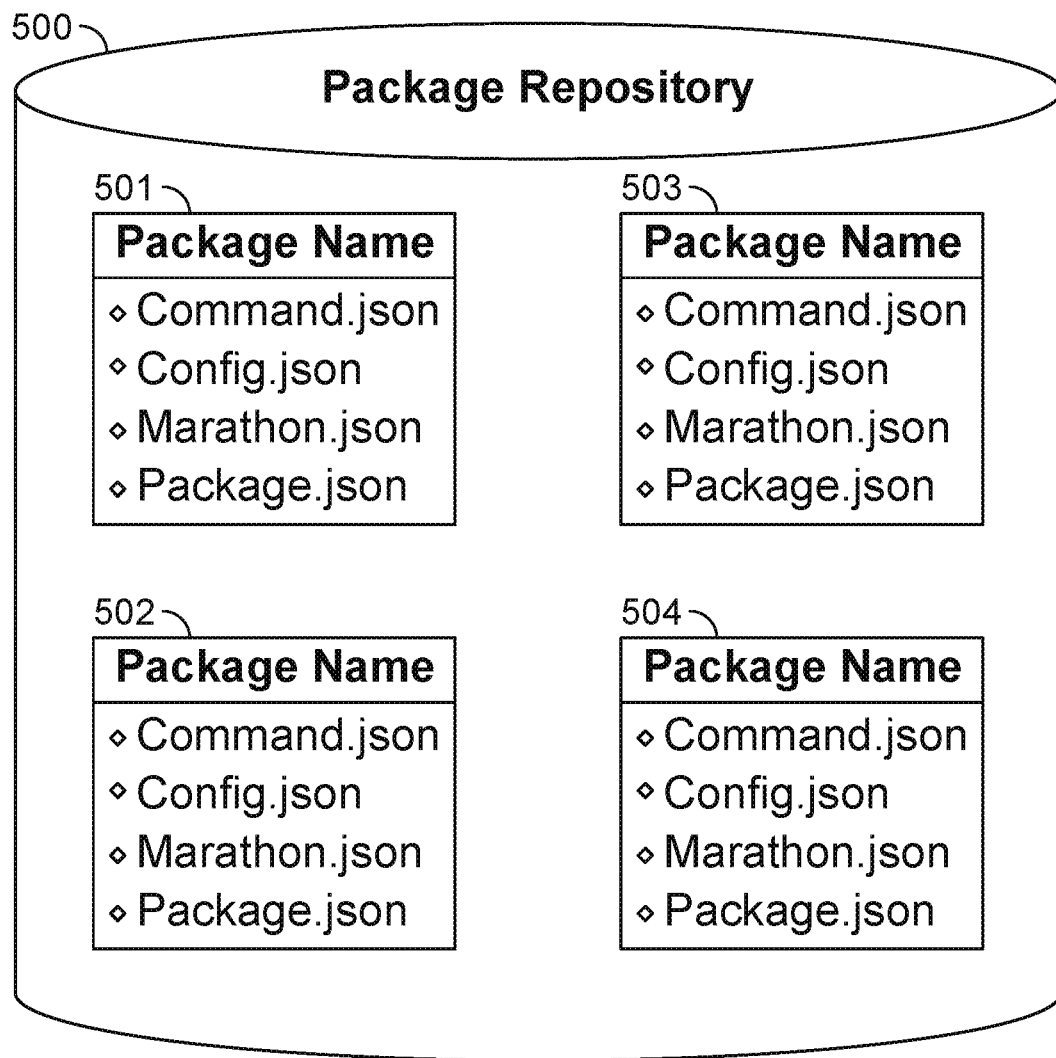
FIG. 5 is a block diagram illustrating an embodiment of a package repository.

FIG. 5 is a block diagram illustrating an embodiment of a package repository. In some embodiments, package repository 403 of FIG. 4 comprises package repository 500 of FIG. 5. In the example shown, package repository 500 contains package 501, package 502, package 503, and package 504. In some embodiments, packages contain configuration files (e.g., command.json, config.json, marathon.json, and package.json). In some embodiments, a command.json file describes how to install a package's CLI. For example, the file holds Python requirements in order to get a package's command line interface working. In some embodiments, a config.json file has general properties and information about packages and subschedulers. This can include information on repeating tasks and how to determine whether failures are occurring. In some embodiments, the information includes repeating tasks, prerequisite packages, and resource requirements. In some embodiments, the information includes services that are run and monitored. In some embodiments, a marathon.json file is a configuration for a metascheduler. The metascheduler is used to launch new services/tasks as cluster nodes. In some embodiments, a package.json file includes specific information about the subscheduler/package to be installed. In some embodiments, the information includes information to display to the user, such as package descriptions, home pages for packages, tags, and version numbers. In various embodiments, the information includes one or more of the following: package name, package version, package source location, package maintainer, package description, package identifier (e.g., scheduler or not), package images, package licenses, package tags (e.g., for searching), package pre-install notes (e.g., to be shown in the CLI before installation), package post-install notes (e.g., to be shown after the CLI has completed installation), package post-uninstall notes (to be shown after the CLI has completed uninstallation), or any other appropriate information.

Figure 6:
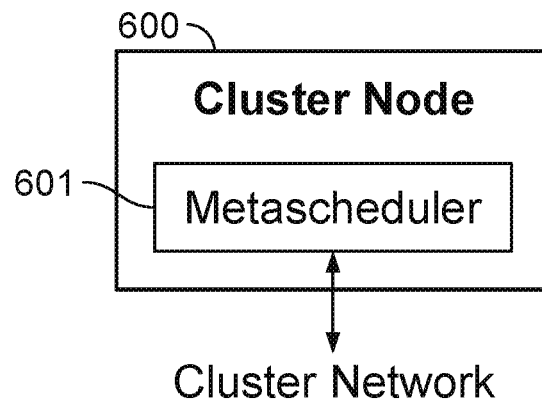
FIG. 6 is a block diagram illustrating an embodiment of a system comprising a cluster node with a metascheduler.

FIG. 6 is a block diagram illustrating an embodiment of a system comprising a cluster node with a metascheduler. In some embodiments, cluster node 600 of FIG. 6 comprises cluster nodes 301, cluster node 302, cluster node 303, cluster node 304, or cluster node 305 of FIG. 3. In the example shown, cluster node 600 includes metascheduler 601. Metascheduler 601 is a scheduler that manages other schedulers (e.g., subschedulers). Metascheduler 601 and subscheduler(s) form a supervisory hierarchy, separating the concerns of maintaining a highly-available scheduler, and coordinating package processes. The supervisory relationship allows for advanced self-healing properties. The metascheduler regularly queries sub schedulers regarding both the health of the subscheduler and the health of package services. For example, if the subscheduler is unable to communicate with the cluster manager, it may report an unhealthy status, prompting metascheduler to kill that process and launches a new instance elsewhere in the cluster.

In some embodiments, metascheduler 601 registers with a cluster manager and is monitored by the cluster manager. In the event that metascheduler 601 fails or is unresponsive, the cluster manager kills that process and launches a new instance elsewhere in the cluster.

In some embodiments, registration includes providing information for monitoring and enabling restarting of a process. For example, a process (e.g., a subscheduler, a metascheduler, a task process, etc.) registers with a cluster manager or another cluster process (e.g., a metascheduler, a subscheduler, a task process, etc.) so that the process can be monitored to make sure that it is functioning properly. In the event that the process has an error, the error can be detected, the process can be terminated, and the process can be restarted. In various embodiments, the registration information includes one or more of the following:

User: the user account to run the scheduler under, used for authorization
    Name: name of scheduler, reference in user interface (UI) and endpoints
    ID: unique identifier (Name is not necessarily unique), used as reference in the UI and endpoints
    Failover_timeout: the amount of time to wait before destroying the scheduler's tasks
    Checkpoint: in the event that a task process goes down a checkpoint allows the recovery of the sub scheduler's task
    Role: allows a subscheduler to utilize a bucket of resources, buckets are referenced by name, a subscheduler can register to receive resources by setting its role
    Hostname: the hostname that the subscheduler is running on
    Webui_url: the location that the webui is running at UI uses to forward users from the metascheduler to a subscheduler
    Capabilities: list of capabilities that the subscheduler supports (e.g., revocable resources, etc.)
    Labels: list of labels in key/value pair format allowing subschedulers to add metadata
    Any other appropriate information In some embodiments, information for restarting the process is not in the registration information. In some embodiments, the restart information is exchanged and stored with a cluster unit (e.g., a metascheduler, a subscheduler, a task process, a cluster manager, etc.). In some embodiments, the restart information is exchanged when the subscheduler is added to the metascheduler, the metascheduler stores the restart information, and the metascheduler restarts a subschedulers when an error occurs.

In some embodiments, a cluster manager registers with metascheduler 601 and is monitored by metascheduler 601. In the event that the cluster manager fails or is unresponsive, the metascheduler 601 kills that process and launches a new instance elsewhere in the cluster.

Figure 7:
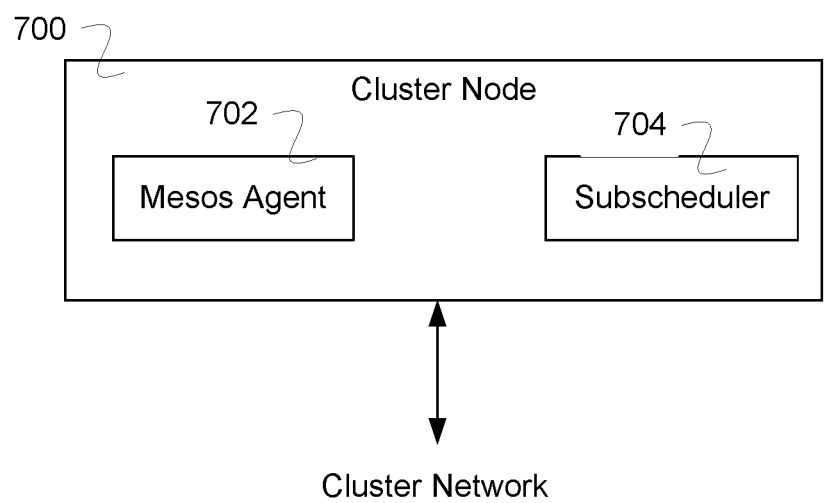
FIG. 7 is a block diagram illustrating an embodiment of a system comprising a cluster node as part of a cluster system for running a mesos agent and a sub scheduler.

FIG. 7 is a block diagram illustrating an embodiment of a system comprising a cluster node as part of a cluster system for running a mesos agent and a subscheduler. In some embodiments, cluster node 700 of FIG. 7 comprises cluster node 301, cluster node 302, cluster node 303, cluster node 304, or cluster node 305 of FIG. 3. In the example shown, cluster node 700 includes mesos agent 702 and subscheduler 704. A metascheduler launches subscheduler 704 via a cluster manager and using mesos agent 702.

In some embodiments, subscheduler 704 registers with a cluster manager and is monitored by the cluster manager. In the event that subscheduler 704 fails or is unresponsive, the cluster manager kills that process and launches a new instance elsewhere in the cluster.

Figure 8:
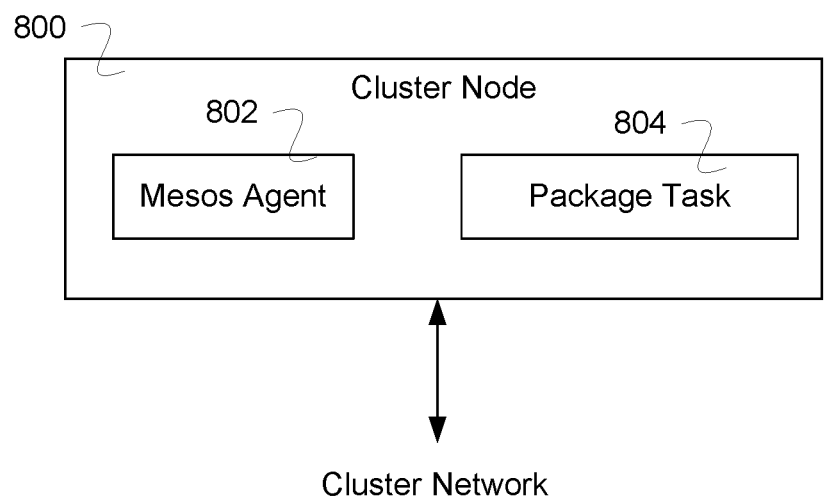
FIG. 8 is a block diagram illustrating an embodiment of a system comprising a cluster node as part of a cluster system for running a mesos agent and package tasks.

FIG. 8 is a block diagram illustrating an embodiment of a system comprising a cluster node as part of a cluster system for running a mesos agent and package tasks. In some embodiments, cluster node 800 of FIG. 8 comprises cluster node 301, cluster node 302, cluster node 303, cluster node 304, or cluster node 305 of FIG. 3. In the example shown, cluster node 800 includes mesos agent 802 and package task 804. A subscheduler launches package task 804 and monitors and controls task execution. In various embodiments, in the event that tasks fail to respond, tasks are running slowly, tasks executers are idle, the subscheduler kills task executers, launches more task executers, or any other appropriate action.

In some embodiments, executing tasks register with a cluster manager and are monitored by the cluster manager as well as a subscheduler. In the event that the subscheduler fails or is unresponsive, the cluster manager kills that process and launches a new instance elsewhere in the cluster as well as the executing tasks.

Figure 9:
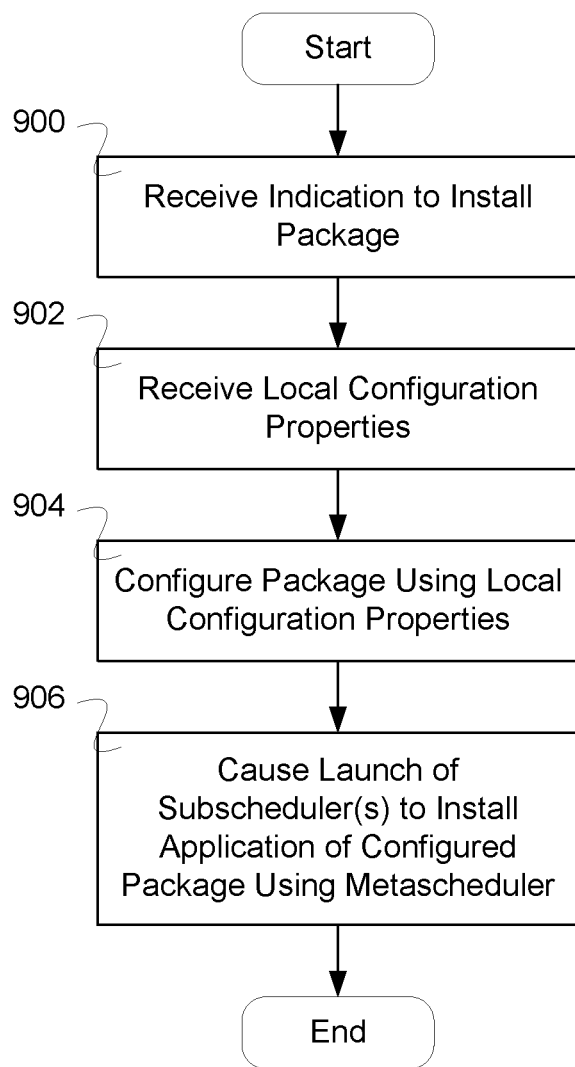
FIG. 9 is a flow diagram illustrating an embodiment of a process for configuring and installing packages on a cluster system by launching subschedulers using a metascheduler.

FIG. 9 is a flow diagram illustrating an embodiment of a process for configuring and installing packages on a cluster system by launching subschedulers using a metascheduler. In some embodiments, the process of FIG. 9 is executed using the system of FIG. 1. In the example shown, in 900, an indication to install a package is received. For example, a cluster manager receives a request to install a package. In 902, local configuration properties are received. For example, the local configuration properties are stored in a json file that is created by the end user and passed to the CLI using a command line argument. In 904, a package is configured using the local configuration properties. For example, a package as stored in a package repository is retrieved and configured using a set of local configuration properties. In 906, the system causes the launch of subscheduler(s) to install the application of the configured package using a metascheduler, and the process ends.

Figure 10:
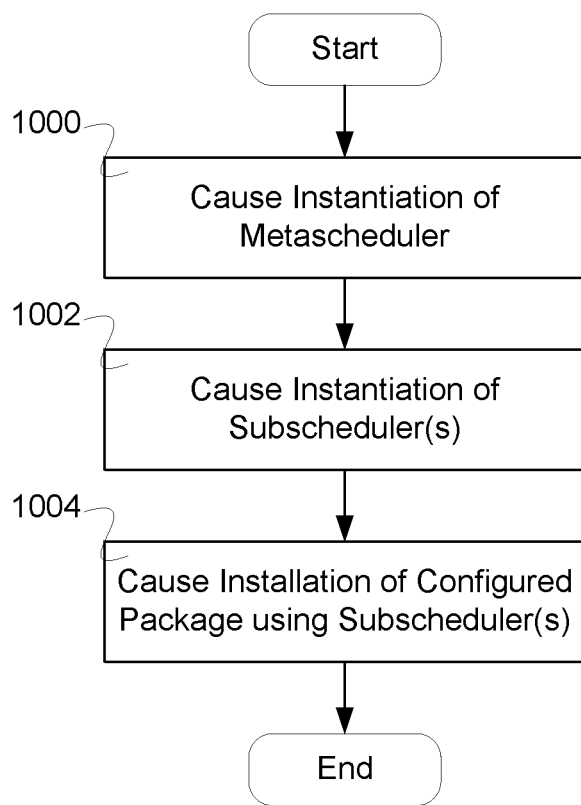
FIG. 10 is a flow diagram illustrating an embodiment of a process for managing a package.

FIG. 10 is a flow diagram illustrating an embodiment of a process for managing a package. In some embodiments, the process of FIG. 10 is implemented 906 of FIG. 9. In the example shown, in 1000 an instantiation of a metascheduler is caused. For example, a cluster manager causes the instantiation of a metascheduler on a cluster node. In 1002, an instantiation of subscheduler(s) is/are caused. For example, a cluster manager causes the instantiation of one or more subschedulers by requesting that the metascheduler instantiate the one or more subschedulers. In 1004, an installation is caused for a configured package using a subscheduler. For example, a cluster manager causes the installation of a configured package on one or more agents using the one or more subschedulers.

Figure 11:
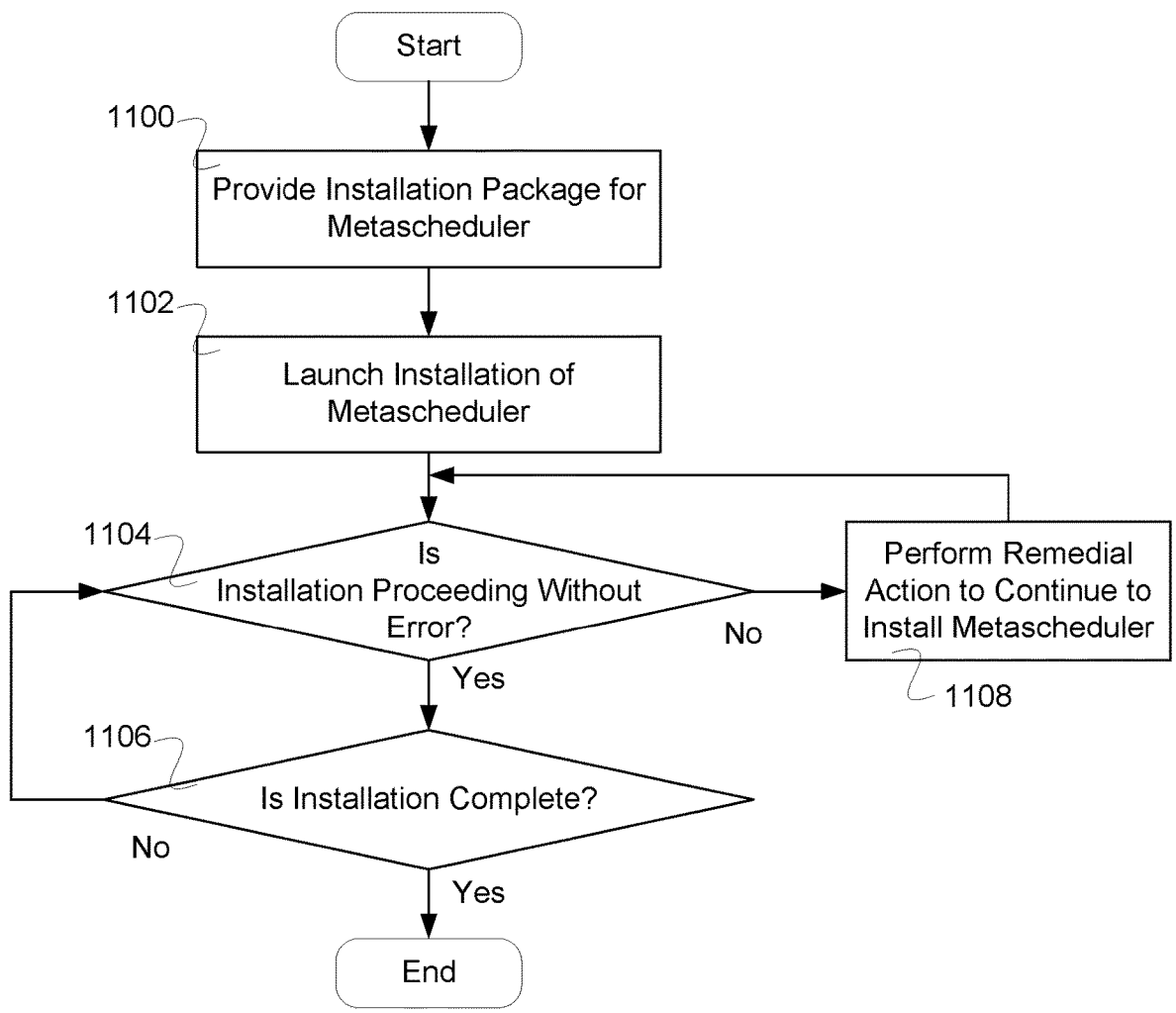
FIG. 11 is a flow diagram illustrating an embodiment of a process for causing an instantiation of a metascheduler.

FIG. 11 is a flow diagram illustrating an embodiment of a process for causing an instantiation of a metascheduler. In some embodiments, the process of FIG. 11 is used to implement 1000 of FIG. 10. In the example shown, in 1100 an installation package for metascheduler is provided. In 1102, installation of metascheduler is launched. In 1104, it is determined whether the installation is proceeding without error. In the event that installation is not proceeding without error, in 1108 remedial action is performed to continue to install the metascheduler, and control passes 1104. In the event that installation is proceeding without error, in 1106 it is determined whether installation is complete. In the event that installation is not complete, then control passes to 1104. In the event that installation is complete, then process ends.

Figure 12:
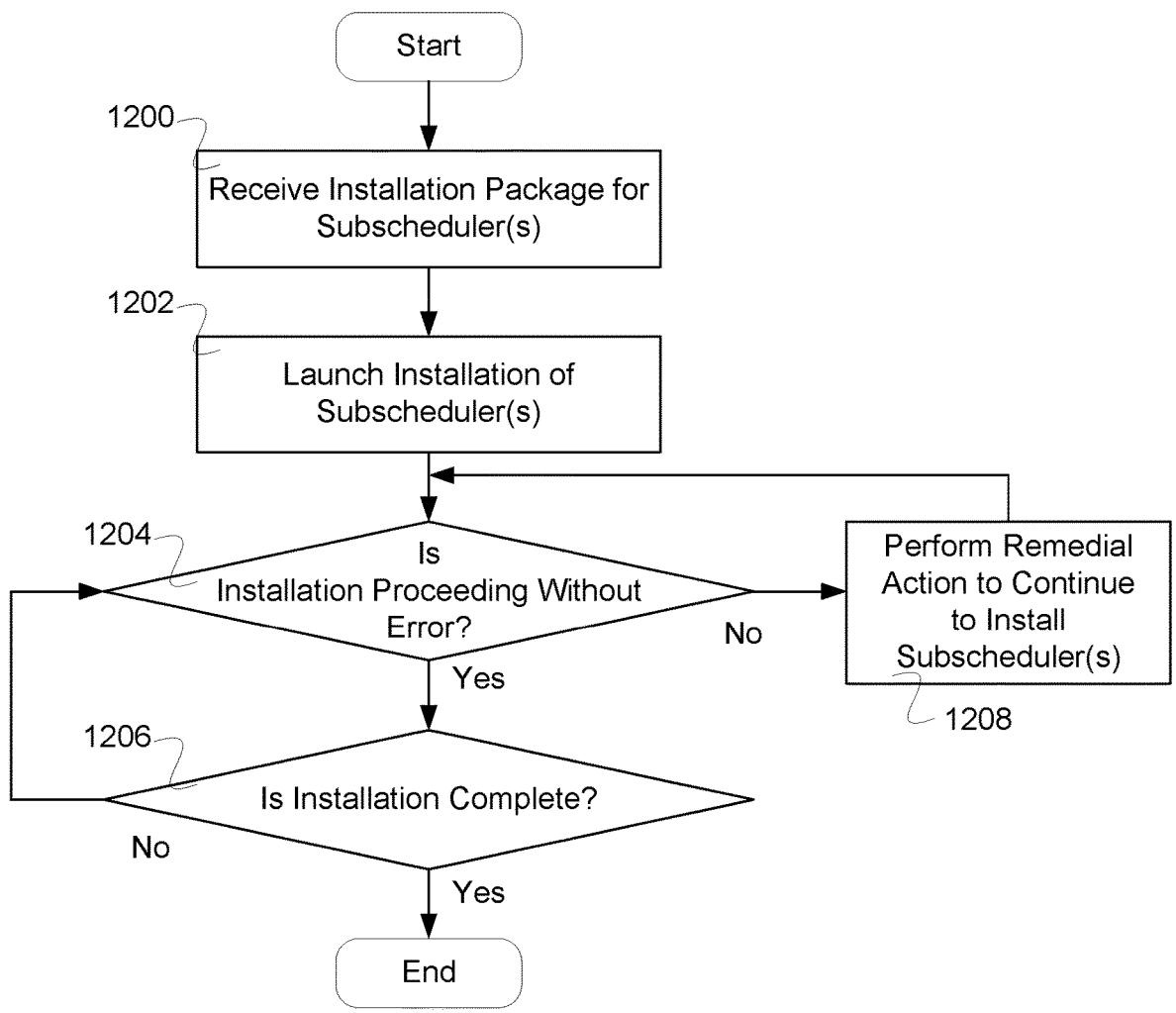
FIG. 12 is a flow diagram illustrating an embodiment of a process for causing an instantiation of a subscheduler.

FIG. 12 is a flow diagram illustrating an embodiment of a process for causing an instantiation of a subscheduler. In some embodiments, the process of FIG. 12 is used to implement 1002 of FIG. 10. In the example shown, in 1200 an installation package for subscheduler(s) is received. In 1202, installation of subscheduler(s) is/are launched. In 1204, it is determined whether the installation is proceeding without error. In the event that installation is not proceeding without error, in 1208 remedial action is performed to continue to install the subscheduler(s), and control passes 1204. In the event that installation is proceeding without error, in 1206 it is determined whether installation is complete. In the event that installation is not complete, then control passes to 1204. In the event that installation is complete, then process ends.

Figure 13:
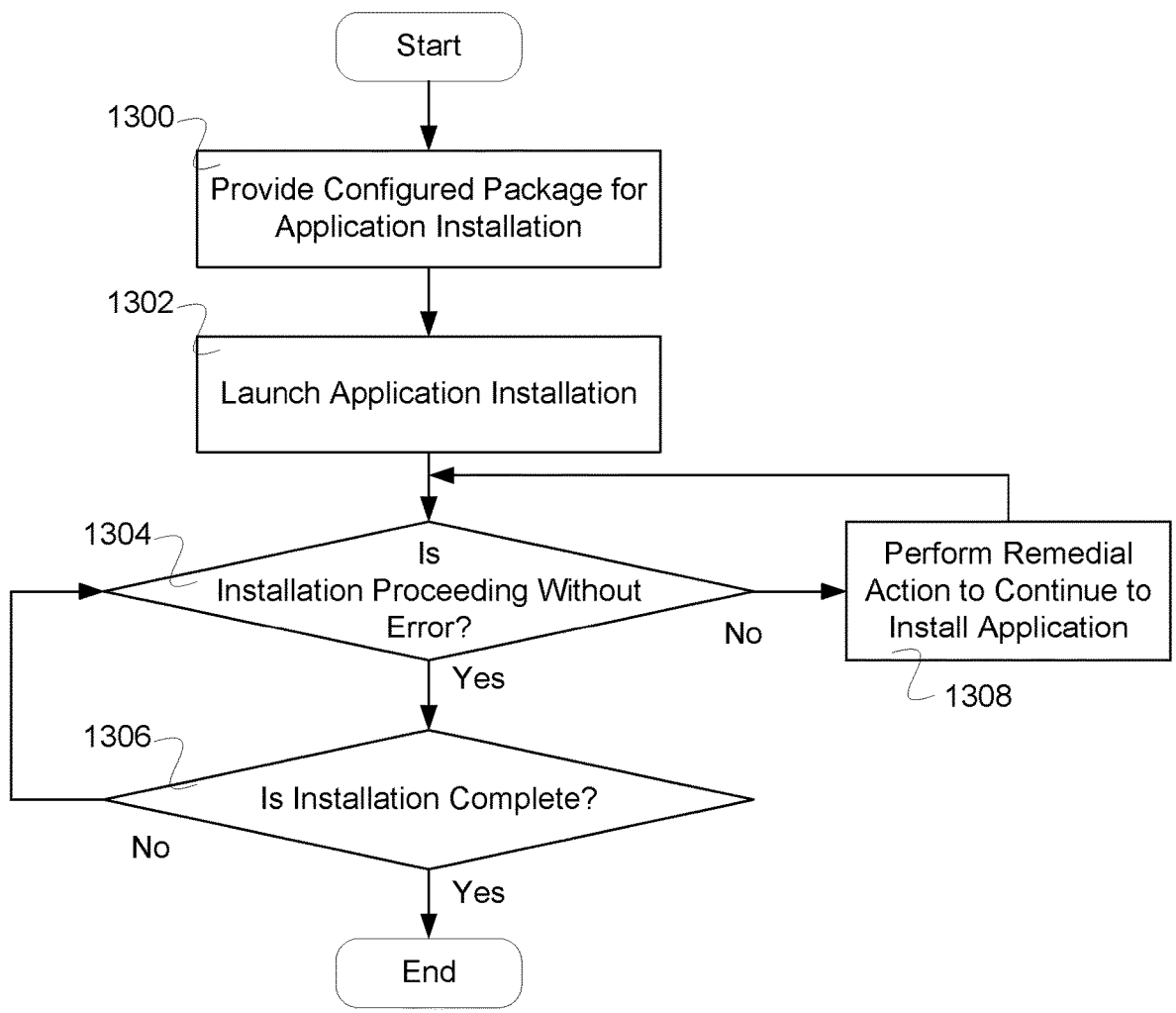
FIG. 13 is a flow diagram illustrating an embodiment of a process for causing an installation of a package.

FIG. 13 is a flow diagram illustrating an embodiment of a process for causing an installation of a package. In some embodiments, the process of FIG. 13 is used to implement 1004 of FIG. 10. In the example shown, in 1300 configured package for application installation is provided. In 1302, application installation(s) is/are launched. In 1304, it is determined whether the installation is proceeding without error. In the event that installation is not proceeding without error, in 1308 remedial action is performed to continue to install the application(s), and control passes 1304. For example, installation of the application is monitored using the subscheduler, and upon failure, the installation process is killed and restarted. In the event that installation is proceeding without error, in 1306 it is determined whether installation is complete. In the event that installation is not complete, then control passes to 1304. In the event that installation is complete, then process ends.

Figure 14:
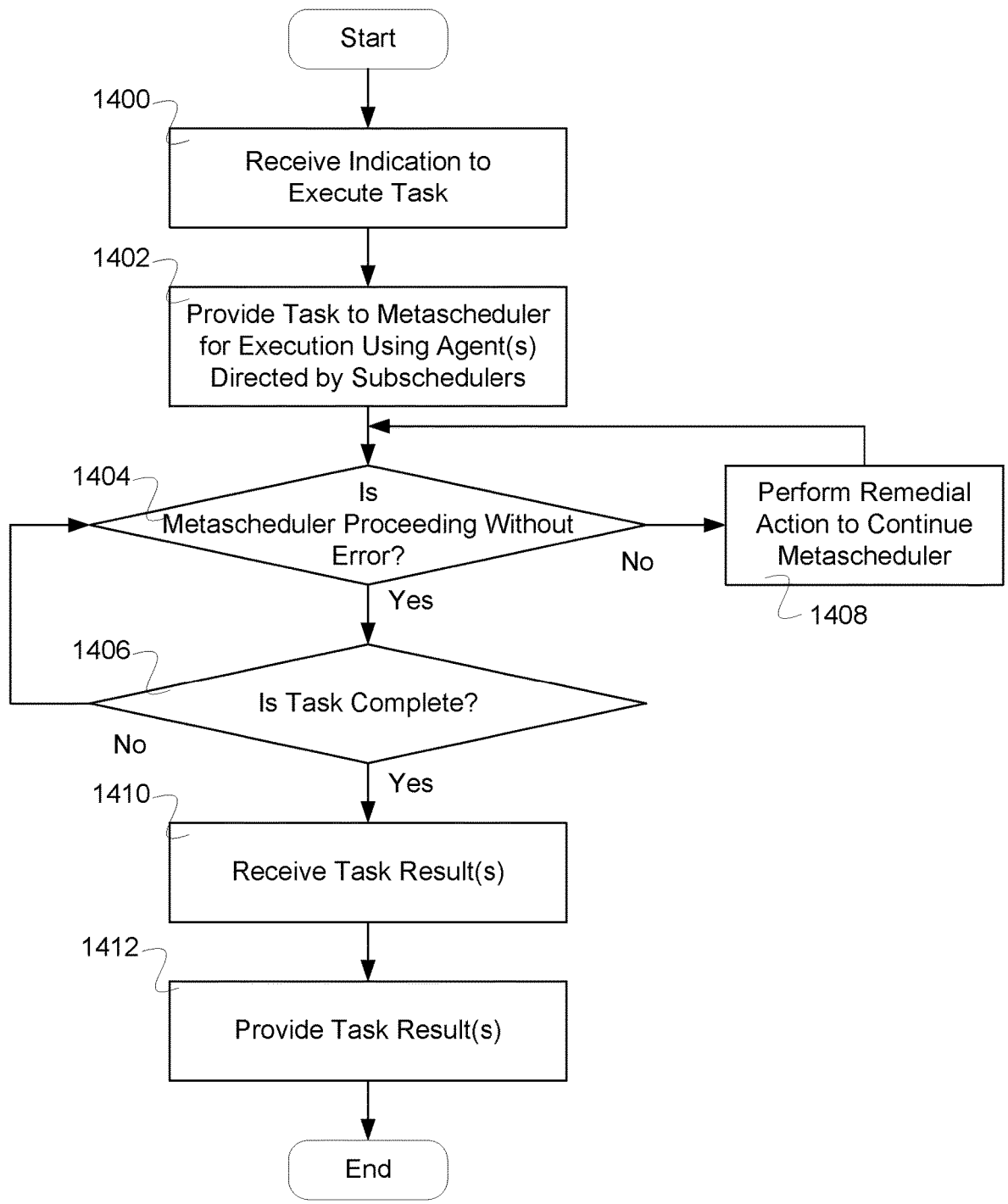
FIG. 14 is a flow diagram illustrating an embodiment of a process for executing a task using the cluster.

FIG. 14 is a flow diagram illustrating an embodiment of a process for executing a task using the cluster. In the example shown, in 1400 an indication to execute a task is received. In 1402, task is provided to metascheduler for execution using agent(s) directed by subschedulers. For example, the cluster manager provides the metascheduler a task. In 1404, it is determined whether metascheduler is proceeding without error. In the event that metascheduler is not proceeding without error, in 1408 remedial action is performed to continue metascheduler, and control passes 1404. For example, the cluster manager monitors the metascheduler and detects failure, kills the metascheduler process, and restarts the metascheduler. In the event that installation is proceeding without error, in 1406 it is determined whether task is complete. In the event that task is not complete, then control passes to 1404. In the event that the task is complete, then in 1410 task result(s) is/are received. For example, task results are generated by agents performing task and passed to a subscheduler, a metascheduler, and/or the cluster manager. In 1412, task result(s) are provided. For example, the task results are provided to the requestor that requested to execute the task.

Figure 15:
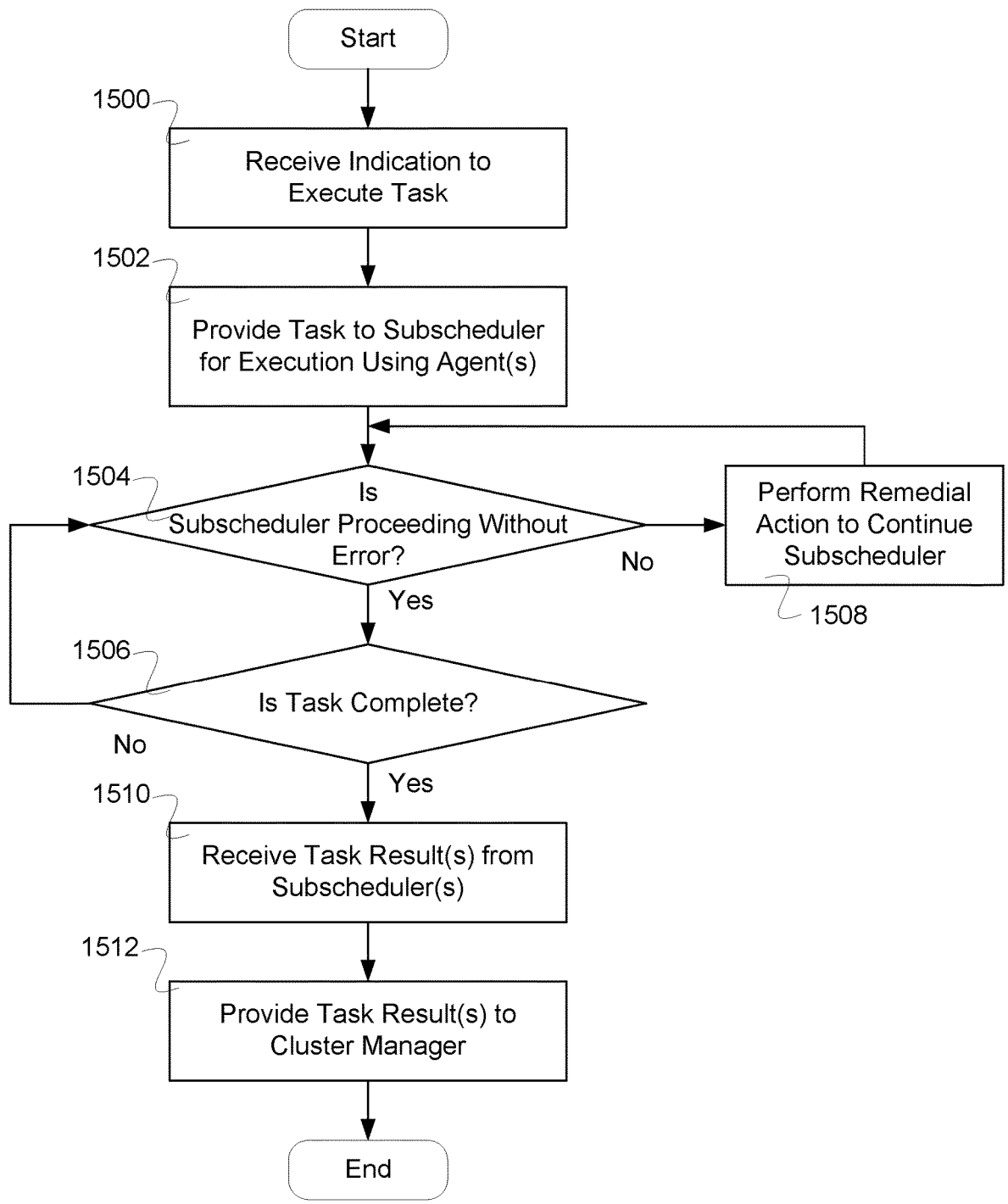
FIG. 15 is a flow diagram illustrating an embodiment of a process for executing a task using the cluster.

FIG. 15 is a flow diagram illustrating an embodiment of a process for executing a task using the cluster. In some embodiments, the process of FIG. 15 is used to implement 1402 of FIG. 14. In the example shown, in 1500 an indication to execute a task is received. For example, metascheduler receives indication to execute a task. In 1502, task is provided to a subscheduler for execution using agent(s). In 1504, it is determined whether subscheduler is proceeding without error. For example, the metascheduler monitors one or more subschedulers or a set of subschedulers associated with task execution. In the event that subscheduler is not proceeding without error, in 1508 remedial action is performed to continue subscheduler, and control passes 1504. For example, the metascheduler monitors the set of subschedulers associated with performing a task, detects a failure of a subscheduler, kills the subscheduler process, and restarts the subscheduler. In the event that subscheduler is proceeding without error, in 1506 it is determined whether task is complete. In the event that task is not complete, then control passes to 1504. In the event that the task is complete, then in 1510 task result(s) is/are received from sub scheduler. In 1512, task result(s) are provided to cluster manager. For example, the task results are provided to the requestor that requested to execute the task by providing them to the cluster manger and then to the requestor.

Figure 16:
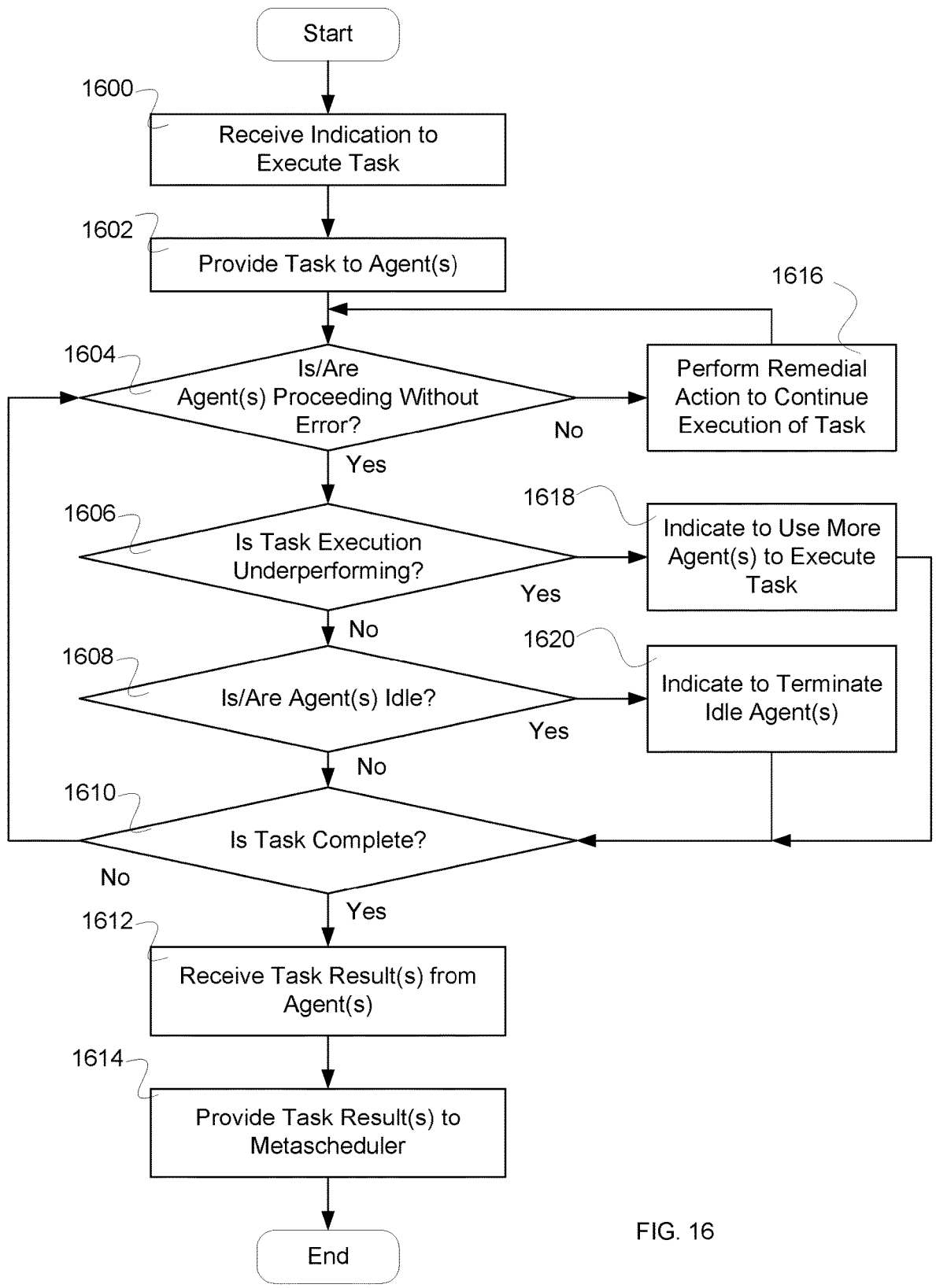
FIG. 16 is a flow diagram illustrating an embodiment of a process for executing a task using the cluster.

FIG. 16 is a flow diagram illustrating an embodiment of a process for executing a task using the cluster. In some embodiments, the process of FIG. 16 is used to implement 1502 of FIG. 15. In the example shown, in 1600 an indication to execute a task is received. For example, subscheduler receives indication to execute a task. In 1602, task is provided to agent(s). In 1604, it is determined whether agent(s) is/are proceeding without error. In the event that agent(s) is/are not proceeding without error, in 16016 remedial action is performed to continue execution of task, and control passes 1604. For example, the subscheduler monitors performance of application when executing a task, and upon detecting an error, kills the task process, and restarts the process (e.g., in the same agent, a different agent, etc.). In the event that agent(s) is/are proceeding without error, in 1606 it is determined whether task execution is underperforming. In the event that task execution is underperforming, in 1618 it is indicated to use more agent(s) to execute the task, and control passes to 1610. In the event that task execution is not underperforming, then in 1608 it is determined whether there is/are agent(s) idle. In the event that agent(s) is/are idle, then in 1620 it is indicated to terminate idle agent(s), and control passes to 1610. In the event that agent(s) is/are not idle, then in 1610 it is determined whether task is complete. In the event that task is not complete, then control passes to 1604. In the event that the task is complete, then in 1612 task result(s) is/are received from agent(s). In 1614, task result(s) are provided to meta scheduler. For example, the task results are provided to the requestor that requested to execute the task by determining the results using an agent and providing them to the subscheduler, to the metascheduler, to the cluster manager, and then to the requestor.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for package management, comprising:
an interface to:
receive an indication to install a package; and
a processor configured to:
determine a configured package using a set local configuration properties and using the package; and
launch, using a metascheduler, a set of subschedulers to install a plurality of applications of the configured package, comprising to:
cause instantiation of a subscheduler of the set of subschedulers to install an application, comprising to:
determine whether the subscheduler is performing the installation without error; and
in response to a determination that the subscheduler is not performing the installation without error, perform a remedial action.

2. A system as in claim 1, wherein the processor is also to monitor the set of subschedulers.

3. A system as in claim 2, wherein monitoring the set of subschedulers detects a failure of a subscheduler of the set of subschedulers.

4. A system as in claim 3, wherein the metascheduler restarts the subscheduler in response to a determination that the failure of the subscheduler is detected.

5. A system as in claim 1, wherein processor comprises a processor of a cluster manager of a cluster.

6. A system as in claim 5, wherein the processor is also to monitor the metascheduler.

7. A system as in claim 6, wherein monitoring the metascheduler detects a failure of the metascheduler.

8. A system as in claim 7, wherein the cluster manager restarts the metascheduler in response to a determination that the failure of the metascheduler is detected.

9. A system as in claim 1, wherein a subscheduler is executed using a cluster node of a cluster.

10. A system as in claim 9, wherein the subscheduler installs the application of the plurality of application of the configured package on one or more nodes of the cluster.

11. A system as in claim 10, wherein the subscheduler monitors the installation of the application.

12. A system as in claim 11, wherein monitoring the installation detects a failure to install the application.

13. A system as in claim 12, wherein the subscheduler restarts the installation of the application in response to a determination that the failure to install the application is detected.

14. A system as in claim 10, wherein the subscheduler monitors performance of the application when executing a task.

15. A system as in claim 14, wherein monitoring the performance of the application detects a failure of the application.

16. A system as in claim 15, wherein monitoring the performance of the application detects under performance.

17. A system as in claim 14, wherein monitoring the performance of the application detects idle resources.

18. A method of package management, comprising:
receiving an indication to install a package; and
determining, using a processor, a configured package using a set local configuration properties and using the package; and
launching, using a metascheduler, a set of subschedulers to install a plurality of applications of the configured package, comprising:
causing instantiation of a subscheduler of the set of subschedulers to install an application, comprising:
determining whether the subscheduler is performing the installation without error; and
in response to a determination that the subscheduler is not performing the installation without error, performing a remedial action.

19. A computer program product for package management, the computer program product being embodied in a non-transitory computer readable storage medium and comprising computer instructions for:
receiving an indication to install a package; and
determining a configured package using a set local configuration properties and using the package; and
launching, using a metascheduler, a set of subschedulers to install a plurality of applications of the configured package, comprising:
causing instantiation of a subscheduler of the set of subschedulers to install an application, comprising:
determining whether the subscheduler is performing the installation without error; and
in response to a determination that the subscheduler is not performing the installation without error, performing a remedial action.

* * * * *